United States Patent
Sakaue et al.

(10) Patent No.: US 6,377,361 B1
(45) Date of Patent: *Apr. 23, 2002

(54) IMAGE PROCESSING DEVICE AND IMAGE FORMING APPARATUS

(75) Inventors: Eiichi Sakaue; Naofumi Yamamoto, both of Tokyo; Hidekazu Sekizawa; Hiroki Kanno, both of Yokohama, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,956

(22) Filed: Jan. 12, 1999

(30) Foreign Application Priority Data

Jan. 19, 1998 (JP) .......................................... 10-007661

(51) Int. Cl.⁷ .............................................. G06K 15/00
(52) U.S. Cl. ......................... 358/1.9; 382/275; 358/458
(58) Field of Search ................................ 358/458, 459, 358/1.9, 448, 466; 382/274, 275, 264, 298, 252, 299, 308

(56) References Cited

U.S. PATENT DOCUMENTS

| | | | | |
|---|---|---|---|---|
| 4,194,221 A | * | 3/1980 | Stoffel | 358/283 |
| 5,260,799 A | * | 11/1993 | Loce et al. | 358/300 |
| 5,404,233 A | * | 4/1995 | Nagata et al. | 358/447 |
| 5,592,190 A | * | 1/1997 | Okada et al. | 345/89 |
| 5,708,514 A | | 1/1998 | Higuchi et al. | 358/458 |
| 5,760,811 A | * | 6/1998 | Seto et al. | 358/298 |
| 5,774,167 A | * | 6/1998 | Hara | 348/298 |
| 6,016,206 A | * | 1/2000 | Koide | 358/298 |
| 6,029,021 A | * | 2/2000 | Nishimura et al. | 399/49 |

FOREIGN PATENT DOCUMENTS

| | | |
|---|---|---|
| JP | 5-95477 | 4/1993 |
| JP | 8-125860 | 5/1996 |
| JP | 8-125863 | 5/1996 |

* cited by examiner

*Primary Examiner*—Dov Popovici
*Assistant Examiner*—King Y. Poon
(74) *Attorney, Agent, or Firm*—Foley & Lardner (57) ABSTRACT

In an image processing device, image data is buffered by an image buffer section to output an interested pixel value and surrounding pixel values of a pixel surrounding an interested pixel. A shift condition determination section determines on the basis of the interested pixel value and the surrounding pixel values whether or not the interested pixel value should be shifted, and outputs a shift determination result. A pixel shifting amount computing section computes the pixel shifting amount of the interested pixel, and the shifted pixel position calculation section outputs a shift pixel position signal on the basis of setting parameters Tx and Ty, and clock signals XCLOCK and YCLOCK. A pixel value shifting section outputs the interested pixel value after the shifting on the basis of the interested pixel value, a shift determination result, the pixel shifting amount, and the shift pixel position signal.

4 Claims, 7 Drawing Sheets

PULSE WIDTH TO BE UNSTABLY RECORDED

PULSE WIDTH CAPABLE OF BEING STABLY RECORDED

IMAGE PROCESSING DEVICE AND IMAGE FORMING APPARATUS

BACKGROUND OF THE INVENTION

This invention relates to an image processing device for processing an image on an original document read with use of a scanner, for example, and an image forming device having the image processing device.

In recent years, a hard copying machine capable of multilevel recording by controlling the size or the density of dots in units of pixel has been widely known. The multilevel recording is advantageous in that highly precise tone expression can be attained in comparing with the pseudo-tone expression by the binary recording, and the texture can be represented smoothly. On the other hand, it is difficult to record each level of the multilevel recording constantly at a stable state. Particularly, the recording of highlighted portions (i.e., small dots or dots having a low density) on a sheet is very difficult, and inconsistencies in density may occur in the image.

In order to solve the problem, there has been proposed a method (Japanese Patent KOKAI Application No. 8-125863) which has been known as a prior art by Oda et al. This method is intended to prevent the fluctuation of the recording level of the highlighted portions in the image. According to this method, a plurality of tone conversion tables are prepared, and the level of the highlighted portions is converted with use of one of the tone conversion tables to a zero-level at which no tone is applied on the sheet. With use of the other tone conversion tables, the levels of the highlighted portions are stabilized by converting the levels of the high-lighted portions to a higher levels at which tone is stably applied to the sheet. By periodically switching the plurality of tone conversion tables for each pixel, the pixels in the highlighted portions are set to have a stable large size or a high density, otherwise, set to form no dot. The pixel forming no dot is also stable in a point of view.

This technique, however, employs a plurality of tone conversion methods are independent from each other, and the density of each pixel is converted irrelevant to the values of the pixels surrounding the pixel to be converted. Accordingly, this method is effective for the image having a smooth density distribution, but is ineffective for the image pattern or character in which density changes bit by bit. In such an image, the original image density is not maintained after the conversion, particularly, in the image having a pattern frequency approximate to the tone conversion switching frequency, moiré patterns will be generated due to the conversion.

According to this technique, the pixel the level of which is to be converted into the zero-level at which no tone is applied is determined by the positions of the pixel. In this case, non-zero level pixels are present only on the determined pixel, in the other portion, the density of the entire image is lowered.

Further, the tone conversion switching frequency corresponds to the tone conversion table one to one. Accordingly, in order to record the image having a plurality of tone conversion switching frequency, the corresponding number of tone conversion tables to that of the switching frequencies need to be provided resulting in the increase of the circuit size.

The image having a plurality of tone conversion switching frequencies can be converted with use of one tone conversion table if the contents of the tone conversion table is rewritten one by one in accordance with a plurality of tone conversion switching frequency. However, it is difficult to switch the frequencies in the same image due to the limit in the rewriting speed.

As described above, according to the technique of preventing the problem due to the highlighted portions by periodically switching a plurality of independent tone conversion methods, the image having high frequency components may be deteriorated, or the periodic pattern cannot be determined.

BRIEF SUMMARY OF THE INVENTION

The object of the present invention is thus to provide an image processing device which can maintain original image density, prevent the generation of moiré patterns and deterioration of the image, and reduce the frequency of the pattern of highlighted portions to form a pattern having a flexible period, and an image forming device having the image processing device.

According to the present invention, the above-mentioned object is attained by an image processing device comprising:

input means for inputting a plurality of pixel data which constitute an image;

determination means for determining whether or not a level of a value of interested pixel data in the pixel data input by the input means is lower than a specific pixel value level;

adding means for, when the determination means determine that the level of interested pixel data is lower than the specific pixel value level, shifting the interested pixel data from a position at which the interested pixel data is input, to a position of the other pixel data, and adding the interested pixel data to the other pixel data; and output means for outputting the pixel data processed by the adding means.

According to the present invention, the above-mentioned object is also attained by an image processing device comprising:

line structure forming means for forming a line structure;

dot structure forming means for converting the line structure formed by the line structure forming means to a dot structure in accordance with image density; and image processing means for converting an input first image signal into a second image signal with use of the line structure forming means and the dot structure forming means, in which a high density portion is converted into a line texture, and a low density portion is converted into a dot texture.

According to the present invention, the above-mentioned object is also attained by an image processing device comprising:

input means for inputting a plurality of pixel data which constitute an image;

determination means for determining whether or not a level of a value of interested pixel data in the pixel data input by the input means is lower than a specific pixel value level;

computing means for, when the determination means determine that the pixel value level of interested pixel data is lower than the specific pixel value level, computing a shifting amount by which the interested pixel data is shifted from a position at which the interested pixel data is input, to a position of the other pixel data;

calculation means for calculating a pixel position signal of a pixel to be shifted on the basis of a pixel clock signal of the pixel data in a main scanning direction and a line clock signal of the pixel data in a sub scanning direction;

adding means for shifting the interested pixel data by the shifting amount from a position at which the interested pixel data is input to a position of the other pixel data, which is computed by the computing means on the basis of the pixel position signal output from the calculation means, the adding means adding the shifted interested pixel data to the other pixel data; and output means for outputting the pixel data processed by the adding means.

According to the present invention, the above-mentioned object is also attained by an image processing device comprising:

input means for inputting a plurality of pixel data which constitute an image;

determination means for determining whether or not a level of a value of interested pixel data in the pixel data input by the input means is lower than a specific pixel value level;

adding means for, when the determination means determine that the level of interested pixel data is lower than the specific pixel value level, shifting the interested pixel data from a position at which the interested pixel data is input, to a position of the other pixel data, and adding the interested pixel data to the other pixel data;

output means for outputting the pixel data processed by the adding means; and image forming means for forming the image on the basis of the pixel data output from the output means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the drawings.

Figure 1:
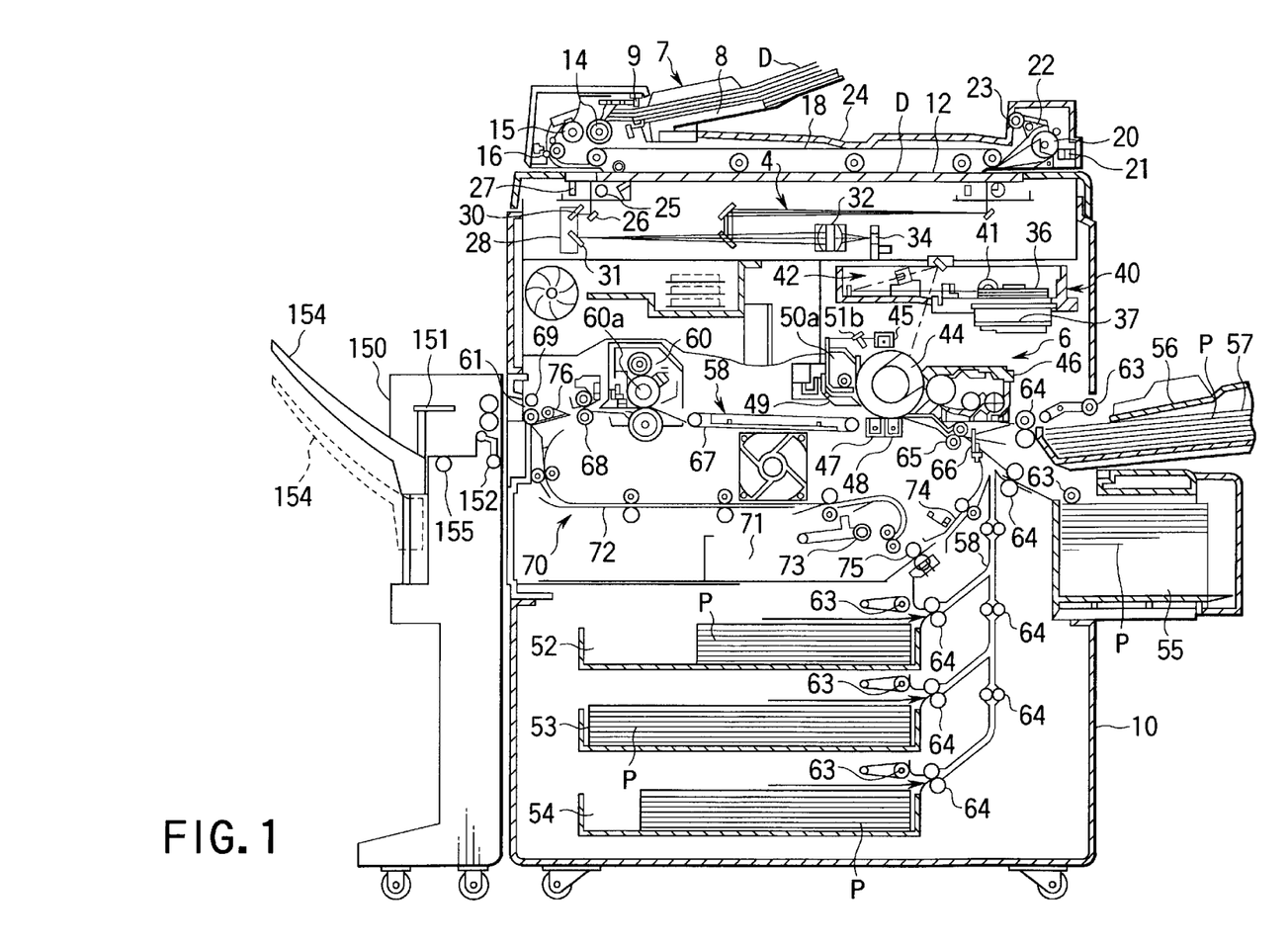
FIG. 1 is a sectional view schematically showing a structure of a digital copying machine according to the present invention.

FIG. 1 is a sectional view showing an inner structure of a digital copying machine as an example of an image processing apparatus according to the present invention. As shown in FIG. 1, the digital copying machine has a body 10 containing a scanner section 4 serving as image reading means and a printer section 6 serving as image forming means.

Figure 2:
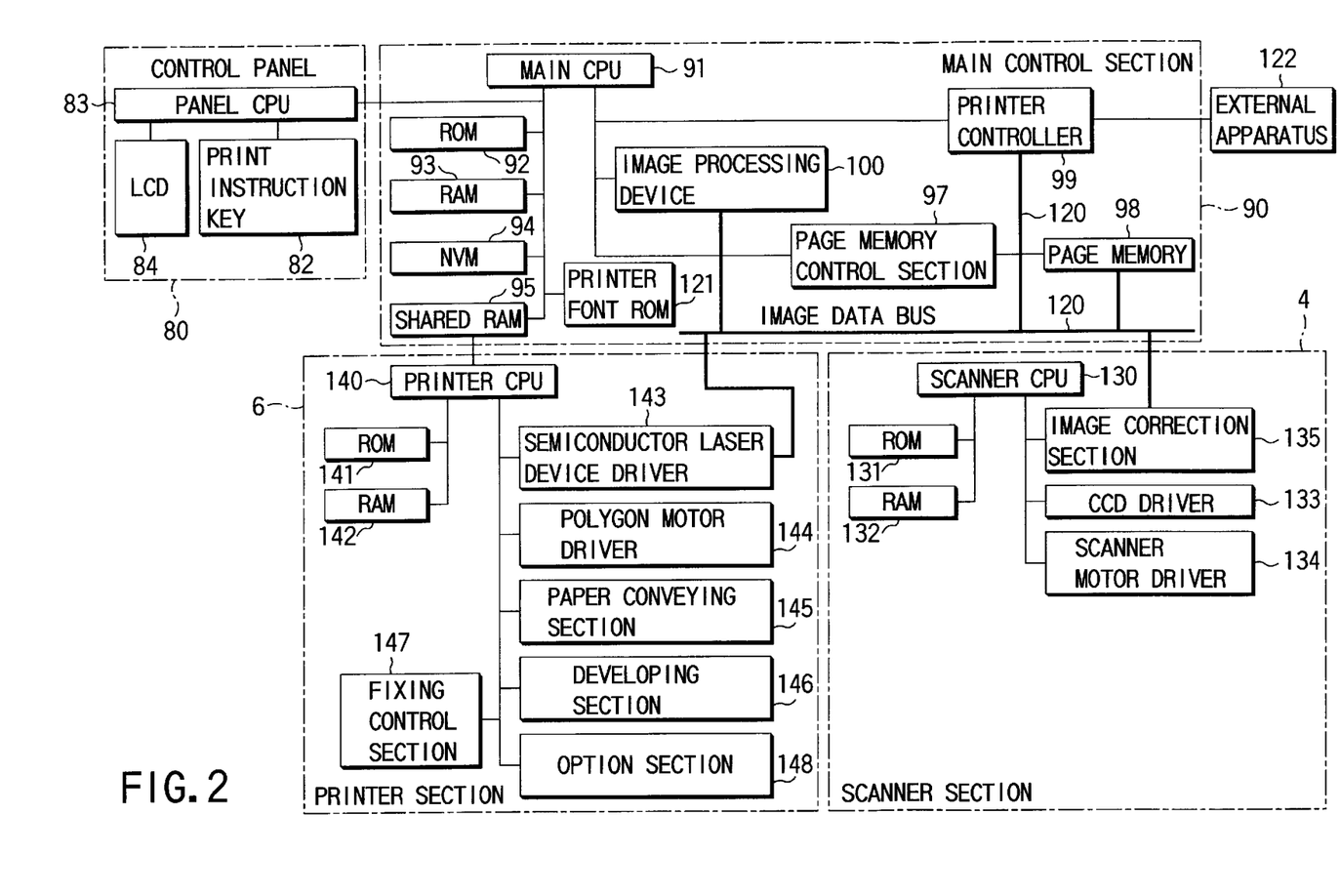
FIG. 2 is a block diagram schematically showing a constitution of the digital copying machine.

FIG. 2 is a block diagram schematically showing the electric connection in the digital copying machine shown in FIG. 1 and the flow of a control signal in the machine. As shown in FIG. 2, the digital copying machine comprises three CPUs: a main CPU 91 in a main control section 90; a scanner CPU 130 in the scanner section 4; and a printer CPU 140 in the printer section 6. The main CPU 91 performs bi-directional communication with the printer CPU 140 through a shared RAM 95. In the bi-directional communication, the main CPU 91 issues operation instruction, and the printer CPU 140 sends its own status to the main CPU 91 in reply thereto. The printer CPU 140 and the scanner CPU 100 performs serial communication in which the printer CPU 140 issues operation instruction, and the scanner CPU 100 returns its own status in reply thereto.

The main CPU 91 is connected to an operation panel 80 comprising a panel CPU 41 which inclusively controls the apparatus; a LCD 42; and a print instruction key 43.

The main control section 90 comprises the main CPU 91; a ROM 92; a RAM 93; a NVM 94; the shared RAM 95; an image processing device 100; a page memory control section 97; a page memory 98; a printer controller 99; and a printer font ROM 121.

The main CPU 91 inclusively controls the main control section 90. The ROM 92 stores a control program. The RAM 93 temporarily stores data.

The NVM (Non-Volatile RAM) 94 is a non-volatile memory backed up by a battery (not shown) for keeping data even when a power supply is stopped.

The shared RAM 95 is used for the bi-directional communication between the main CPU 91 and the printer CPU 140.

The page memory control section 97 is used to store/read the image data in/from the page memory 98. The page memory 98 has a memory area capable of storing the image data of a plurality of pages, and is formed to store data in units of a page by compressing the image data transmitted from the scanner section 4.

The printer font ROM 121 stores font data corresponding to print data to be printed.

The printer controller 99 decodes the print data transmitted from an external apparatus 122 such as a personal computer in order to obtain the image data having resolution corresponding to resolution data added to the print data by use of the font data stored in the printer font ROM 121.

The scanner section 4 comprises the scanner CPU 100 for inclusively controlling the scanner section 4; a ROM 131 storing a control program or the like; a RAM 132 for storing data; a CCD driver 133 for driving the CCD sensor 34; a scanner motor driver 134 for controlling the rotation of a motor for moving the exposing lamp 25, the first, second, and third mirrors 7, 11, and 12, and the like; and an image correction section 135 having an A/D conversion circuit for converting an analog signal output from the CCD sensor 34 into a digital signal, a shading correction circuit for correcting the fluctuation of the threshold level of the signal output from the CCD sensor 34, which may be caused by the variation of the sensitivity of CCD image devices in the CCD sensor 34 or the ambient temperature change, and a line memory for temporarily storing the digital signal subjected to the shading correction by the shading correction circuit.

The printer section 6 comprises the printer CPU 140 for inclusively controlling the printer section 6; a ROM 141 storing a control program or the like; a RAM 142 for storing data; a semiconductor laser device driver 143 for turning on/off the semiconductor laser device 41; a polygon motor driver 144 for controlling the rotation of the polygon motor 37 of the exposing device 50; a paper conveying section 145 for controlling the conveyance of the sheet P by a conveying mechanism 20; a developing section 146 for performing the charging, developing, and transferring with use of the charger 45 and a transfer device 48; a fixing control section 147 for controlling a fixing device 60; and an option section 148.

An image processing device 100, the page memory 98, the printer controller 99, the image correction section 135, and the laser driver 143 are connected to each other by an image data bus 120.

The technical idea of the image processing device in the image forming device of the present invention will be described below. The process of the present invention is performed for the pixel values in highlighted portions in which a dot cannot stably recorded such that a part (or all) of the pixel values are collected by being shifted to a specified position corresponding to the pixel value and the pixel position. The periodic texture is generally not recognized as noise, and thus the specified position is preferably arranged at periodic positions in the image.

Figures 3A, 3B:
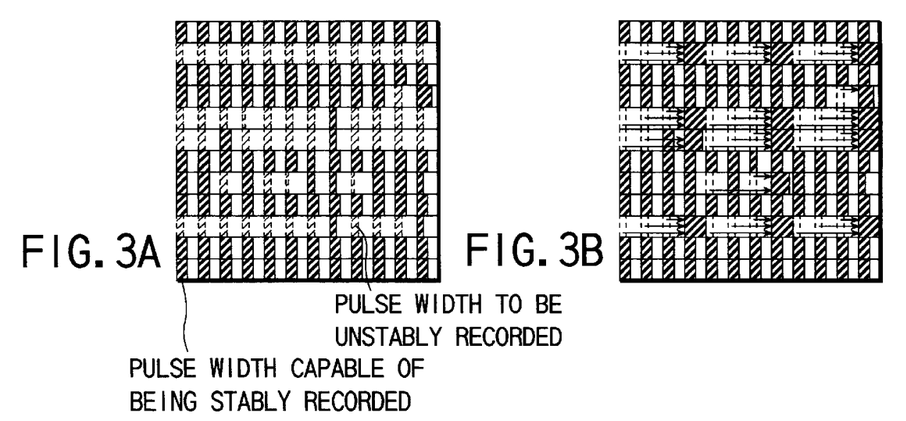
FIGS. 3A, 3B, 3C, and 3D are drawings for explaining a process by the present invention.

FIG. 3A schematically shows the most general waveform of a pulse generated by an image processing device which controls the size of the dot in accordance with the pulse-duration modulation to perform the multilevel recording. The width of the rectangular region in each pixel represents the width of the pulse of the pixel. The smaller the pulse width is, the smaller the size, and the density of the dot is. As shown in FIG. 3A, the pulses of the pixels are all located on the left ends of the pixels, and all directed in the vertical direction (sub scanning direction). Such a pattern having pulses directed in the vertical direction is called a line pattern. With use of this pattern, an image can be recorded relatively stably, and thus this pattern has been widely used.

Rectangular regions shaded by thin lines are highlighted portions each having a small pixel value. In FIG. 3A, the rectangular regions each represents a pulse having a very small width, in which the dot cannot be stably recorded. On the other hand, rectangular regions shaded by thick lines each represents a pulse having a large width in which the dot can be stably recorded. If the image having such a pulse waveform is recorded with no modulation, inconsistencies in density may be generated in the image with remarkably high possibility: the dots in the thin-shaded regions may be recorded with very high density according to the condition or may not be recorded as a dot to form a blank.

FIG. 3B shows that small width pulses represented as thin-shaded rectangular regions in FIG. 3A are shifted to the specific positions. The initial point, end point, and length of arrows in the drawing respectively represent the position of the pixel to be shifted, the position to which the pixel is to be shifted, and the pixel shifting amount. By executing the pixel shifting operation in this manner, the short pulses which cause the above-mentioned trouble are eliminated as shown in this drawing.

Further, the image has large-valued pixels at periodic positions, and thus can be recognized as a dot structure with no apparent inconsistency. The general organic dither is formed by comparing the pixel value with the threshold value matrix, or by changing $\gamma$ of the pixel value periodically. Accordingly, when the input image pattern has the frequency component approximate to the frequency component of the threshold value matrix or the frequency component of the change of the $\gamma$, the original pixel values cannot be maintained after forming the dither, resulting that moiré patterns may be generated. On the other hand, according to the method of the present invention, the pixel values are shifted as mentioned above, and thus the pixel values can be maintained even after forming the dither, and moiré patterns will not be generated.

Figure 3C:
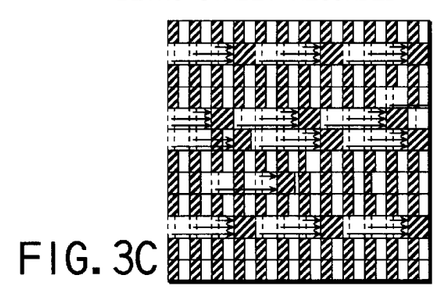

FIG. 3C shows the pattern having lines different in arrangement of the periodic shifted positions. The pattern of the periodic position and the line pattern in FIG. 3B greatly differ from each other in frequency component. On the other hand, the periodic positions shown in FIG. 3C are arranged in different manner from one line to another line, thereby the spatial frequency in the sub scanning direction increases. Such a pattern has little difference to the line pattern, and thus the boundary of the patterns is not formed so clearly. Further, in the multicolor recording, the periodic pattern can be changed from one color to another by varying the shifting amount by color, thereby the generation of moiré patterns can be reduced.

The pattern of FIGS. 3B and 3C has the threshold value th for determining whether the dot can be recorded stably or unstably as in the pattern shown in FIG. 3A. When the pixel value is smaller than the threshold value th, all (100%) of the pulses are shifted to the periodic positions, and when the pixel values are larger than the threshold value th, the pulses are left with no shift. FIGS. 4A, 4B, 4C, and 4D show the output levels of the pixel value before the shifting and after the shifting.

Figure 4A:
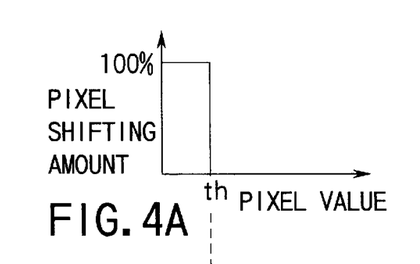
FIGS. 4A, 4B, 4C, and 4D are drawings for explaining a process by the present invention.
Figure 4B:
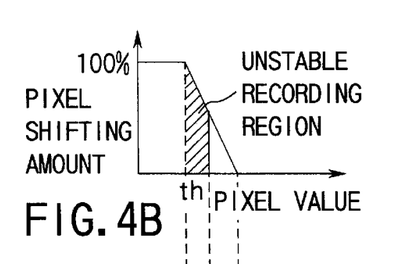
Figure 4C:
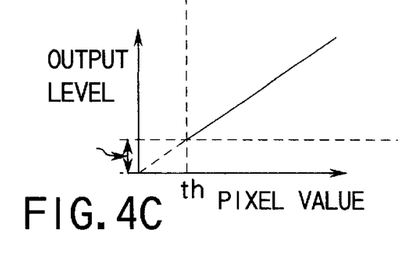
Figure 4D:
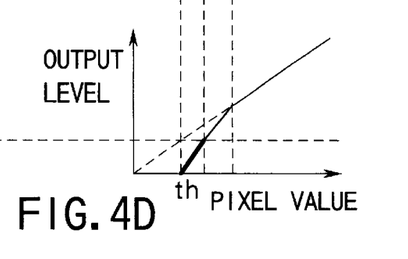

On the other hand, it is also effective for eliminating the trouble to gradually change the dot shift amount according to the density of the pixel, as shown in FIG. 4B. According to this method, the transition from the periodic pattern to the line pattern can be performed smoothly. In this case, a part of the pixel values in the thin-shaded region is shifted, and thus the non-shifted pulse (a region represented as a bold line in a graph of FIG. 4D) may have small pulse width unstable to be recorded.

However, the small pulses are arranged adjacent to periodic dots, and the pixels are more stable than the patterns of FIGS. 3A and 3C. A method of adjusting tone by the tone process (error distribution process) such that the level of the thin-shaded region may not be visually recognized is also effective in this case.

Figure 3D:
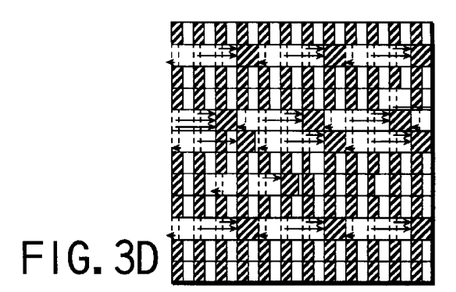

FIG. 3D shows a pixel shifting method that takes into consideration the resolution. The method differs from that of FIG. 3C in that there are arrows directed left. The lengths of the arrows are shortened by the left-directed arrows in comparing with that of FIG. 3C. It means that the pixel shifting amounts are small according to this method. In short, the resolution of the original image is not so deteriorated according to this shifting process.

Figure 5:
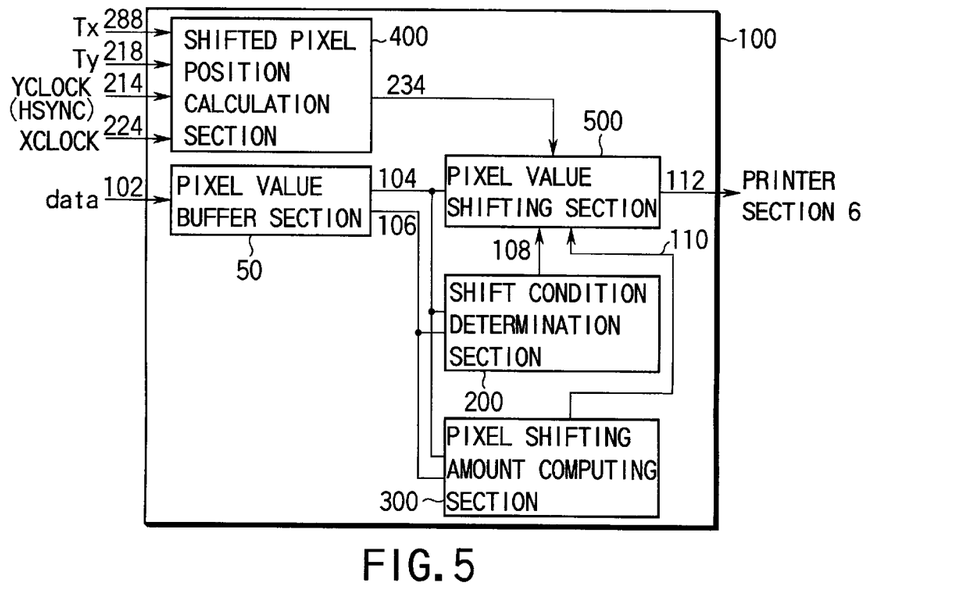
FIG. 5 is a block diagram schematically showing a constitution of an image processing device according to the present invention.

FIG. 5 shows an example of the image processing device 100 according to the present invention. The image processing device 100 comprises a pixel value buffer section 50; a shift condition determination section 200; a pixel shifting amount computing section 300; a shifted pixel position calculation section 400; and a pixel value shifting section 500.

The pixel value buffer section 50 buffers the image data (data) 102, and outputs an interested pixel value 104 of an interested pixel and surrounding pixel values 106 of the values of the pixels surrounding the interested pixel.

The shift condition determination section 200 determines on the basis of the interested pixel value 104 and the surrounding pixel values 106 whether or not the interested pixel value 104 should be shifted, and outputs the determination result as a shift determination result 108.

The pixel shifting amount computing section 300 computes the pixel shifting amount 110 of the interested pixel on the basis of the interested pixel value 104 and the surrounding pixel values 106, and outputs it.

The shifted pixel position calculation section 400 receives from the main CPU 91 setting parameters Tx 238 and Ty 218, a pixel clock signal XCLOCK 224, a line clock signal YCLOCK (HSYNC) 214, and outputs a shift pixel position signal 234.

The pixel value shifting section 500 receives the interested pixel value 104, the shift determination result 108, and the shift pixel position signal 234, and the interested pixel value 112 as the pixel value of the interested pixel after the shifting.

Figure 6:
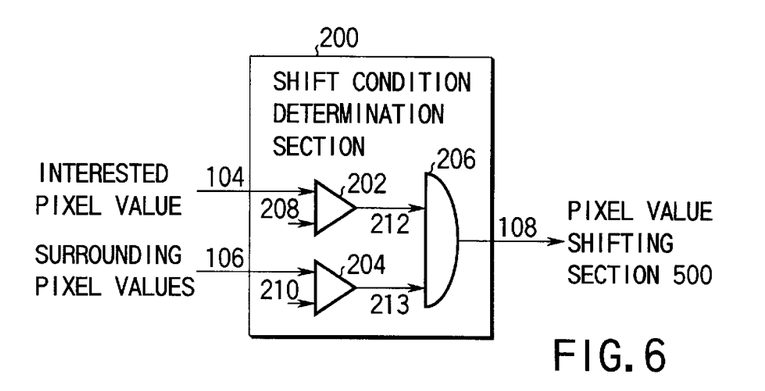
FIG. 6 shows a constitution of a pixel value shifting section.

FIG. 6 shows an example of the shift condition determination section 200. As shown in the drawing, the shift condition determination section 200 has two comparators 202 and 204 and a AND section 206. One comparator 202 compares the interested pixel value 104 and a reference value 208, and outputs a comparison result 212 when the interested pixel value 104 is smaller than a reference value 208. Another comparator 204 compares the surrounding pixel values 106 of the pixel adjacent to the interested pixel on the left side and a reference value 210, and outputs a comparison result 213 when the surrounding pixel values 106 are smaller than the reference value 210. The AND section 206 executes AND of the two comparison results 212 and 213, and output the AND result as the shift determination result 108 to the pixel value shifting section 500.

The reference value 208 is the minimum pixel value at which the dots can be recorded stably. When the interested pixel value is smaller than the minimum value, the pixels are shifted in the above-mentioned manner to collect the pixel values at a position to record dots stably. The determination is obtained with use of the surrounding pixel values 106 because the surrounding pixel values also affect the stableness of the dot recording of the interested pixel.

Figure 7:
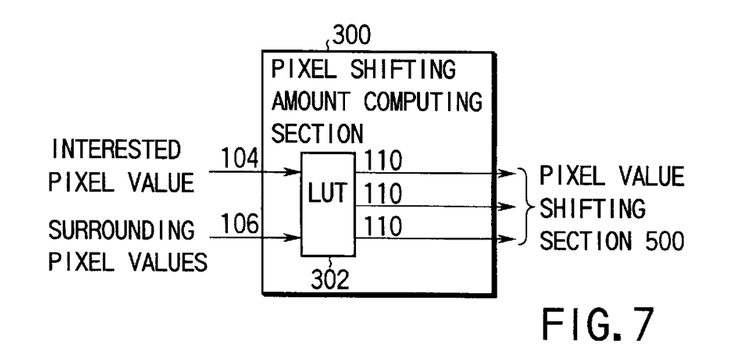
FIG. 7 shows a constitution of the pixel shifting amount calculation section.

FIG. 7 shows an example of the pixel shifting amount computing section 300. As shown in the drawing, the pixel shifting amount computing section 300 has a Look-Up Table (LUT) 302. The LUT 302 receives the interested pixel value 104 and the surrounding pixel values 106 to output a plurality of the pixel shifting amounts 140 to the pixel value shifting section 500.

Figure 8:
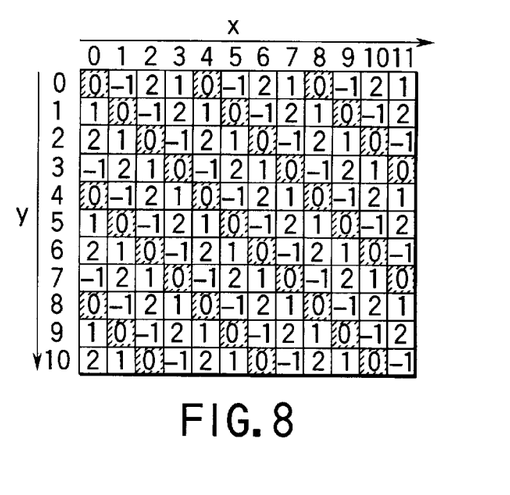
FIG. 8 is a view for schematically explaining an operation of pixel value shifting operation.

Before describing an example of the shifted pixel position calculation section 400, the relationship between each pixel and the shifted position will be described below with reference to FIG. 8. Two figures in each of the pixels of FIG. 8 indicate the shifted position of the pixel. These figures correspond to the lengths of the arrows shown in FIG. 3D, and represents a relative position d of the pixel nearest to the periodic dot position corresponding to the pixel.

The absolute values of the figures each corresponds to the length of the arrow, and indicates the distance (the number of the pixels) from the pixel to be processed to the periodic position. The positive and negative figures indicate the directions of the arrow respectively, and represent on which side of the pixel to be processed the periodic dot position is located. The negative figures indicate the side on which the pixels before the pixel to be processed are located.

The relationship between the position (x, y) of a pixel and the relative position d of the pixel the nearest to the periodic dot corresponding to the pixel is represented as $$d=(x-xs0\{y(\text{mod}Ty)\})\text{mod}Tx \qquad (1)$$

where xs0{M} is a function of M. In this example, M× step is employed as one example (step is a constant). AmodB is a remainder of the division of A by B. The "step" represents the displacement of the periodic positions in one line from another one line. By adjusting the step, the periodic positions can be displaced to form inclination as shown in FIG. 3C. This method may be modified in such a manner that the periodic positions are superposed on an inclined basic texture such as a line structure, thereby the interference between the basic texture and the dots on the periodic position can be prevented.

Figure 9:
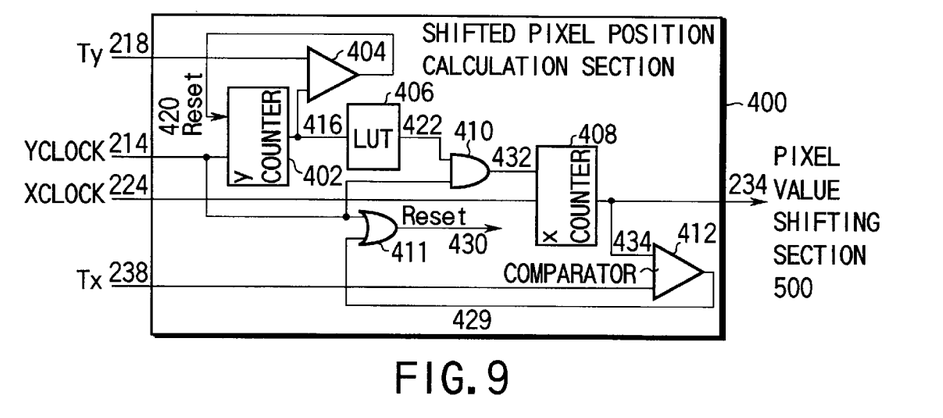
FIG. 9 shows a constitution of the shifted pixel position calculation section.

FIG. 9 shows an example of the shifted pixel position calculation section 400 for realizing this process. The shifted pixel position calculation section 400 comprises a y counter 402; a comparator 404; a Look-Up Table (LUT) 406; an x counter 408; an AND section 410; a OR section 411; and a comparator 412.

The y counter 402 counts up the YCLOCK 214 as a line clock signal in the sub scanning direction, and outputs a counted value 416. The comparator 404 compares the counted value 416 with the setting value Ty 218 sent from the main CPU 91, and outputs a Reset signal 420 when these values are identical. The Reset signal 420 resets the counted value of the y counter 402. The counted value 416 thus corresponds to "y(modTy)" in the formula (1).

The counted value 416 is input into the LUT 406, and an x initial value 422 is output. The x initial value 422 corresponds to "xs0{y(modTy)}" in the formula (1).

The x counter 408 counts up the XCLOCK 224 as the pixel clock signal in the main scanning direction, and outputs the counted value (shift pixel position signal) 234. The comparator 412 compares a branch signal 434 of the counted value (shift pixel position signal) 234 and the setting value Tx 238 sent from the main CPU 91, and outputs a Reset signal 429 when these values are identical. The OR section 411 executes OR of the Reset signal 429 and the YCLOCK 214, thereby the Reset signal 429 is turned into a Reset signal 430. The Reset signal 430 resets the counted value of an x counter 408.

The x initial value 422 is ANDed with the YCLOCK 214 in of the AND section 410 and turned into an initialize (ini)

432. Assuming that the YCLOCK 214 is characterized by rising from "0" to "1" only at the head of each line, ini 432 is set as an x initial value 422 of the x counter when the YCLOCK 214 is "1" (i.e., at the head of each line), and in the other case, set at "0". When the x counter 408 is reset, the initial value of the x counter is set as an ini 432.

As a result of the above-mentioned operation, the counted value (shift pixel position signal) 234 of the x counter 408 is set to be represented as $$d=(x-Xs0\{y(\bmod Ty)\})(\bmod Tx).$$

Figure 10:
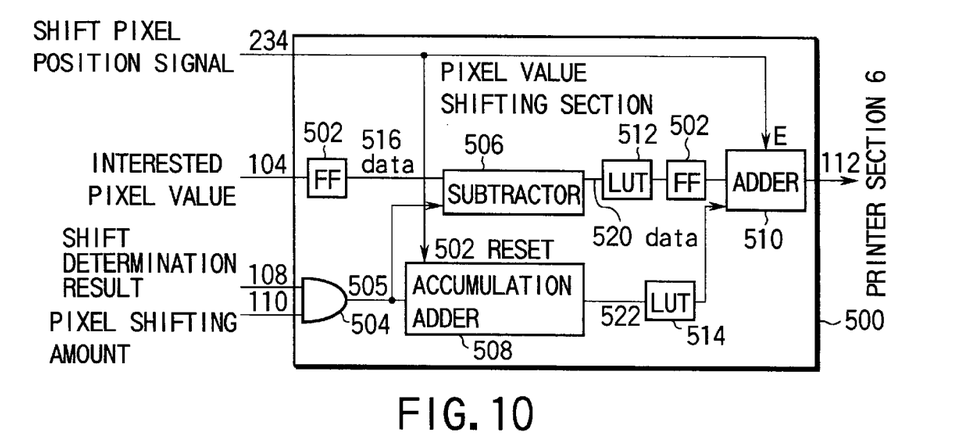
FIG. 10 shows the first constitution of the shifted pixel position calculation section.

FIG. 10 shows the first embodiment of the pixel value shifting section 500. The first example of the pixel value shifting section 500 comprises a plurality of flip-flops (FF) 502, an AND section 504, a subtractor 506, an accumulation adder 508, an adder 510, and two Look-Up Tables (LUT) 512 and 514.

The flip-flops 502 buffer the input interested pixel value 104.

The AND section 504 ANDs the pixel shifting amount 140 sent from the pixel shifting amount computing section 300 and the shift determination result 108 sent from the shift condition determination section 200, and outputs the AND result as a shift value 505.

The subtractor 506 subtracts a shift value 505 from the interested pixel value data (data) 516 buffered by the FF 502, and outputs the subtraction result as data (data) 520. The accumulation adder 508 accumulates the shift values 505, and outputs them as an accumulation value (sum) 522.

When the shift pixel position signal 234 is sent to the pixel value shifting section 500, the sum of the accumulation value 522 and the data 520 is added by the adder 510, thereby the interested pixel value 112 after the shifting is attained. The interested pixel value is then output to the printer 6. The shift pixel position signal 234 is also used to reset the accumulation value 522 sent from the accumulation adder 508 to "0".

By executing the above-mentioned operation, the pixel value is shifted. The pixel value is merely a value as an image signal, and thus is not always output every time when the pixel value is processed by the image processing device 100. Two LUTs 512 and 514 convert the data 520 as the subtraction data and the accumulation value 522, respectively, to adjust the data 520 and the accumulation value 522 such that these values can be compensated even after the process.

Figure 11:
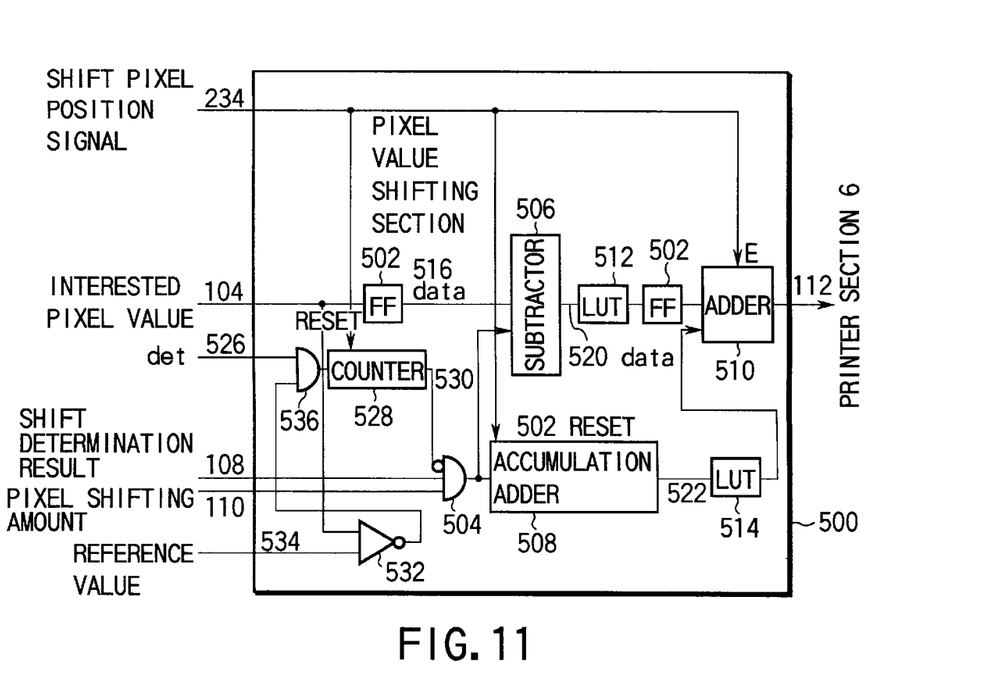
FIG. 11 shows the second constitution of the shifted pixel position calculation section.

FIG. 11 shows the second example of the pixel value shifting section 500. The second example of the pixel value shifting section 500 comprises a plurality of flip-flops (FF) 502, an AND section 504, a subtractor 506, an accumulation adder 508, an adder 510, two Look-Up Table (LUT) 512 and 514, a counter 528, and a comparator 532, and an AND section 536.

The process of the present invention stables the recording of the highlighted portion, but deteriorates the resolution. It is therefore effective in view of the resolution not to execute this process for the character portion in the image, which requires high resolution. Accordingly, the device of the present invention is provided with the function of turning on/off the operation in accordance with the image region discrimination result: i.e., photograph or character.

More specifically, the pixel value shifting is not performed when either one of the interested pixel, the pixel at the position of the corresponding periodic dot, and the pixel between them is determined as the character pixel.

A signal det 526 shown in FIG. 11 is generated in accordance with the image data by using the well-known image region discrimination technique only in the case where the interested pixel 104 is a character. The signal det 526 is counted by a counter 528. A counted value 530 output from the counter 528 represents whether or not there is a pixel discriminated at least from the characters between the interested pixel 104 and the position of the shifted pixel.

When the counted value 530 is not "0", i.e., when there is a pixel discriminated at least from the characters between the interested pixel 104 and the position of the shifted pixel, the AND section 504 outputs a shift value of "0", and the pixel shifting is not performed.

This counted value 530 is sent from the counter 528 and reset by the shift pixel position signal 234. Even if the pixel determined as a character, it may be effective to stabilize the recording irrelevant to the resolution when the pixel has low density. In this case, the comparator 532 for determining the pixel density compares a reference value 534 sent from the main CPU 91 and the interested pixel value 104. When the interested pixel value 104 is smaller than the reference value 534, it is preferable that the signal det 526 which determines the pixel is a character is canceled by the AND section 536, and the pixel shifting is performed.

Figure 12:
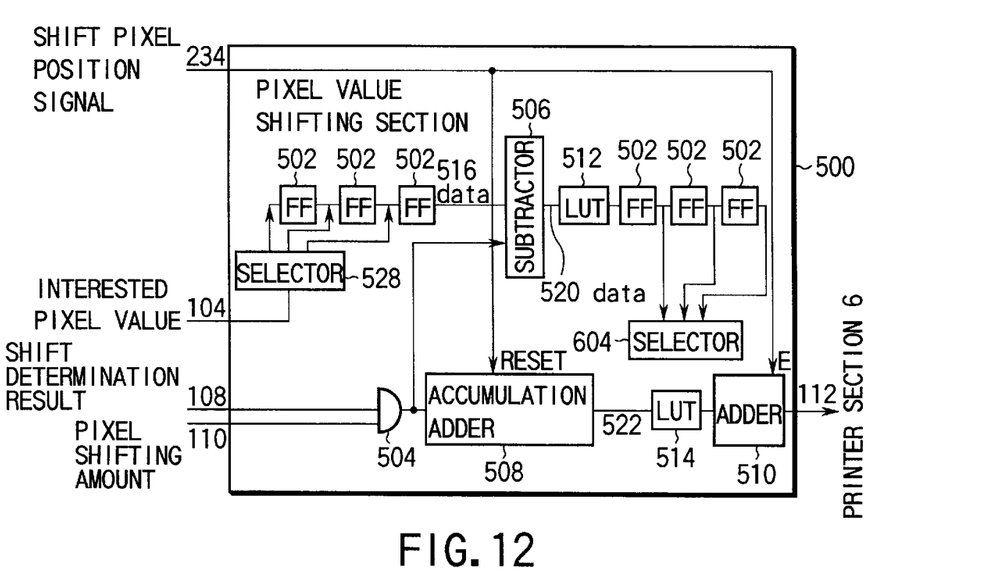
FIG. 12 shows the third constitution of the shifted pixel position calculation section.

FIG. 12 shows the third example of the pixel value shifting section 500. The third example of the pixel value shifting section 500 comprises a plurality of flip-flops (FF) 502, an AND section 504, a subtractor 506, an accumulation adder 508, an adder 510, two Look-Up Tables (LUTs) 512 and 514, and selectors 602 and 604.

The third example of the pixel value shifting section 500 has the selectors 602 and 604, as mentioned above. One selector 602 selects one of the flip-flops, into which the interested pixel value 104 is input, and another one selector 604 selects one of the flip-flops, the output from which is input into the adder 510. By operating the selectors 602 and 604 in this manner, the pixel value can be shifted to any position with any period.

Figure 13:
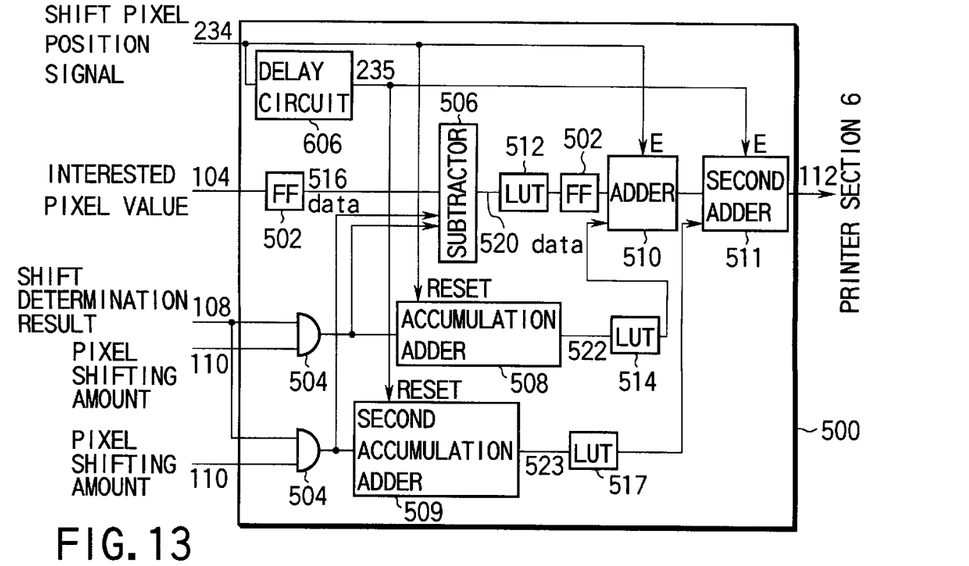
FIG. 13 shows the fourth constitution of the shifted pixel position calculation section.

FIG. 13 shows the fourth example of the pixel value shifting section 500. The fourth example of the pixel value shifting section 500 comprises a plurality of flip-flops (FF) 502, two AND sections 504, a subtractor 506, an accumulation adder 508, a second accumulation adder 509, an adder 510, a second adder 511, three Look-Up Tables (LUTs) 512, 514, and 517, and a delay circuit 606.

In the fourth example of the pixel value shifting section 500, the pixel shifting amount computing section 300 outputs a plurality of pixel shifting amounts 140 as shown in FIG. 7. To simplify the description, the case where there are two pixel shifting amounts 140 will be presented below.

The delay circuit 606 changes the phase of the shift pixel position signal 234, and outputs it as a delayed shift pixel position signal 235. The two pixel shifting amounts 140 are sent to the subtractor 506 and the accumulation adder 508, the subtractor 506 and the second accumulation adder 509, respectively. The subtractor 506 subtracts the sum of the two pixel shifting amounts 140 from the data (data) 516. An enable signal of the second adder 511 is the above-mentioned shift pixel position signal 235 having the changed phase, and thus the pixel value is shifted to even the pixel having the different phase from that of the original periodic positions which are obtained by the adder 510. The distance between the periodic positions is thus the double of that of the aforementioned examples, and the dot frequency is also doubled.

As a result, the flexible periodic dot structure having dot frequencies variable according to the density of the pixel can be attained by adjusting the contents of the Look-Up Tables (LUTs) 512, 514, and 517, and the delay circuit 606.

Figure 14:
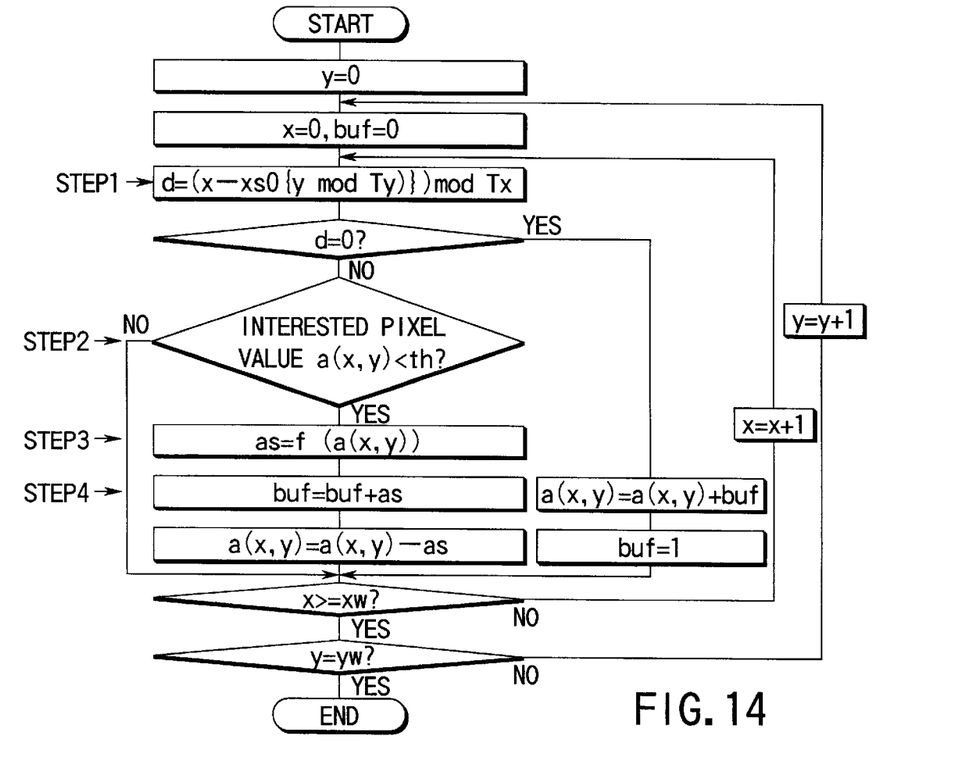
FIG. 14 is a flow chart for explaining the process by the image processing means.

Next, the case where the above-mentioned process is executed with use of a software as image processing means contained in the image processing device 100 having such a structure will be described below with reference to the flow chart of FIG. 14.

The image processing method according to this example comprises a shifted pixel position computing step (STEP 1); a shift condition computing step (STEP 2) ; a pixel shifting amount computing step (STEP 3); an image shift step (STEP 4).

At first, in the shifted pixel position computing step (STEP 1), the position d of the shifted pixel, which corresponds to the position (x, y) of the interested pixel is obtained. An example of the position (x, y) and the position d is represented in the formula (1) cited before.

In the shift condition computing step (STEP 2), it is determined whether or not the interested pixel is the pixel the pixel value of which is to be shifted. In this step, it is determined whether or not the pixel is a highlighted portion which cannot be recorded stably (i.e., whether or not the pixel value a satisfies a relationship [a < the threshold value th]).

In the pixel shifting amount computing step (STEP 3), the pixel shifting amount as is calculated from the interested pixel value a.

In the image shift step (STEP 4), when the shifted pixel position d is not "0", the pixel shifting amount as is subtracted from the interested pixel a, and the pixel shifting amount as is added to the pixel shifting amount buffer buf. When the shifted pixel position d=0, the pixel values of the pixels surrounding the pixel are shifted to be collected, and the value of the pixel shifting amount buffer buf is added to the pixel value a.

As described above, according to the embodiment of the present invention, a part of the pixel value is shifted to the other pixel, thereby the frequency of the pattern in the highlighted portion can be decreased while the density of the entire image is maintained macroscopically, without generating moiré patterns or deteriorating the resolution.

Further, the pixel shifting amount can be easily varied by the setting, thereby a flexible periodic pattern can be obtained.

In addition, the device of the present invention has a plurality of pixel shifting amount buffers, and thus a plurality of patterns sequentially changing the density according to the density conversion can be obtained. Accordingly, the user can select the optimum pattern in accordance with the characteristics of the engine of the copying machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
    a pixel value buffer section for buffering pixel data to be input and outputting a value of a pixel of interest in the buffered pixel data and values of surrounding pixels that surround the pixel of interest;
    a shift condition determination section for determining whether or not the value of the pixel of interest should be shifted based on the value of the pixel of interest and the values of the surrounding pixels output from the pixel value buffer section;
    a shift amount computing section for computing a shift amount of the pixel of interest, based on the value of the pixel of interest and the values of the surrounding pixels output from the pixel value buffer section;
    a shift pixel position calculation section for calculating a pixel position signal of a pixel to be shifted, based on a pixel clock of the pixel data in a main scanning direction and a line clock thereof in a sub scanning direction; and
    a pixel value shift section for outputting a value which the pixel of interest takes after shift processing, based on the value of the pixel of interest, a determination result obtained by the shift condition determination section, the shift amount of the pixel of interest computed by the shift amount computing section, and the pixel position signal calculated by the shift pixel position calculation section,
    wherein the shift condition determination section includes:
        a first comparator for comparing the value of the pixel of interest with a first internal set value and outputting a comparison result when the value of the pixel of interest is smaller than the first internal set value;
        a second comparator for comparing one of the values of the surrounding pixels, which is located to the left of the value of the pixel of interest, with a second internal set value and outputting a comparison result when the one of the values of the surrounding pixels is smaller than the second internal set value; and
        an AND section for ANDing the comparison result output from the first comparator and the comparison result output from the second comparator.

2. An image processing device according to claim 1, wherein the shift amount computing section includes a look-up table for receiving the value of the pixel of interest and the values of the surrounding pixels and outputting a plurality of shift amounts.

3. An image processing device according to claim 1, wherein the shift pixel position calculation section changes a shift for each line in response to the line clock in the sub scanning direction and shifts a plurality of pixels to a periodic position.

4. An image forming apparatus comprising:
    an input section for inputting a plurality of pixel data which constitutes an image;
    a pixel value buffer section for buffering pixel data to be input and outputting a value of a pixel of interest in the buffered pixel data and values of surrounding pixels that surround the pixel of interest;
    a shift condition determination section for determining whether or not the value of the pixel of interest should be shifted based on the value of the pixel of interest and the values of the surrounding pixels output from the pixel value buffer section;
    a shift amount computing section for computing a shift amount of the pixel of interest, based on the value of the pixel of interest and the values of the surrounding pixels output from the pixel value buffer section;
    a shift pixel position calculation section for calculating a pixel position signal of a pixel to be shifted, based on a pixel clock of the pixel data in a main scanning direction and a line clock thereof in a sub scanning direction;
    a pixel value shift section for outputting a value which the pixel of interest takes after shift processing, based on the value of the pixel of interest, a determination result obtained by the shift condition determination section, the shift amount of the pixel of interest computed by the shift amount computing section, and the pixel position signal calculated by the shift pixel position calculation section; and an image forming section for forming an image based on image data constituted by the value output from the pixel value shift section, wherein the shift condition determination section includes:

a first comparator for comparing the value of the pixel of interest with a first internal set value and outputting a comparison result when the value of the pixel of interest is smaller than the first internal set value;

a second comparator for comparing one of the values of the surrounding pixels, which is located to the left of the value of the pixel of interest, with a second internal set value and outputting a comparison result when the one of the values of the surrounding pixels is smaller than the second internal set value; and an AND section for ANDing the comparison result output from the first comparator and the comparison result output from the second comparator.

* * * * *